May 5, 1970 — G. M. COON — 3,509,976
SINGLE CYCLE CONTROL SYSTEM WITH ANTI-REPEAT MEANS
Filed Oct. 11, 1968

INVENTOR.
GEORGE M. COON
BY
Yount, Flynn & Tarolli
ATTORNEYS

United States Patent Office 3,509,976
Patented May 5, 1970

3,509,976
SINGLE CYCLE CONTROL SYSTEM WITH ANTI-REPEAT MEANS
George M. Coon, Shaker Heights, Ohio, assignor to Textrol, Inc., Cleveland, Ohio, a corporation of Ohio
Filed Oct. 11, 1968, Ser. No. 766,869
Int. Cl. F16d 71/00, 67/04
U.S. Cl. 192—142   14 Claims

ABSTRACT OF THE DISCLOSURE

Single cycle control system for a press or the like having an anti-repeat relay for preventing a repeat cycle of operation and a start relay for starting each cycle. The anti-repeat relay is energized initially only if the start relay and valve relays for the machine are de-energized. Valve-operated switches in the initial energization circuit for the anti-repeat relay prevent it from being energized again if the valves for the brake and clutch on the machine do not close at the end of a cycle. The start relay is energized by operating run switches, provided the anti-repeat relay is energized then. Both the start relay and the anti-repeat relay must be energized to start the machine.

---

This invention relates to a single cycle control system for a machine, such as a press or the like.

U.S. Letters Pat. No. 3,004,647 to Everett H. Andrus and George M. Coon discloses a control system for limiting a machine to a single cycle of operation and having provision for insuring that a failure of any of the various components in the control system cannot result in an unexpected repeat stroke of the machine which might endanger the operator. The present invention is directed to a control system for the same general purpose but which is appreciably simplified over the system of said patent and which still insures against a repeat stroke of the machine in the event of a failure of any component of the control system which is critical to the operator's safety.

Accordingly, it is a principal object of this invention to provide a novel and simplified single cycle control system for a machine.

Another object of this invention is to provide such a system which, despite its comparative simplicity and relatively small number of control components, has provision for monitoring the operation of every control component that is critical to the safety of the operator of the machine.

Another object of this invention is to provide a novel and improved single cycle control system having an anti-repeat relay for preventing a repeat cycle of the machine and a start relay, both of which must be energized at the same time for a cycle of the machine to begin.

Another object of this invention is to provide a novel and improved single cycle control system having valve relays for controlling the operation of valves for the brake and the clutch on the machine, a start relay for controlling the operation of the valve relays, and an anti-repeat relay for preventing a repeat cycle of the machine, with the anti-repeat relay being energizable initially only if the start relay and both valve relays are de-energized.

Another object of this invention is to provide a novel and improved single cycle control system having valves for controlling the brake and the clutch on the machine and switches operated by these valves, and an anti-repeat relay for preventing a repeat cycle of the machine which can be energized initially only if the valve switches are in a condition indicating that the valves are closed.

Another object of this invention is to provide a novel and improved single cycle control system having an anti-repeat relay for preventing a repeat cycle of the machine, and having an inching control for starting the machine which includes contacts operated by the anti-repeat relay and arranged to prevent the inching control from starting the machine if the anti-repeat relay is defective.

Further objects and advantages of this invention will be apparent from the following detailed description of a presently-preferred embodiment, which is illustrated schematically in the accompanying drawing.

Figure 3:
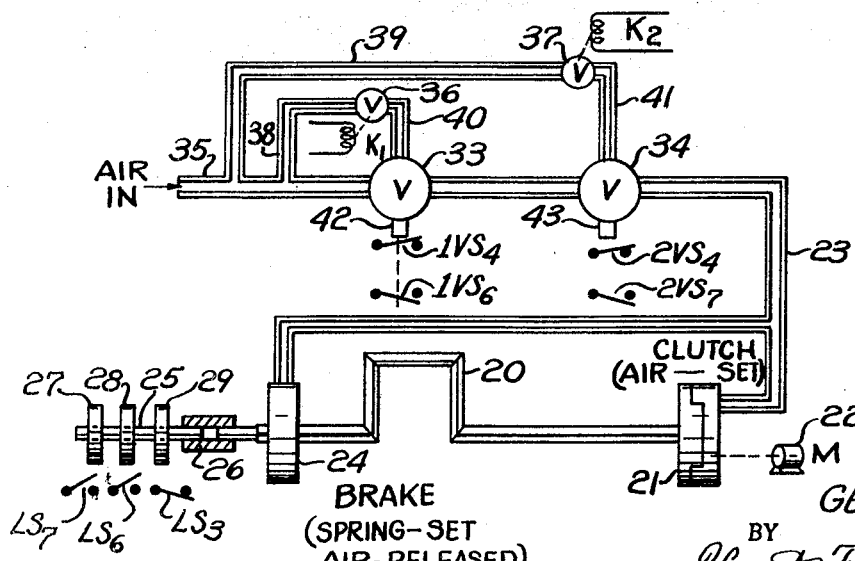
FIG. 3 shows schematically the drive for the crankshaft of a machine, together with the air-operated control for starting and stopping the crankshaft and the various switches operated during each rotation of the crankshaft.

Referring first to FIG. 3, the rotary crankshaft 20 of the machine is connected through a clutch 21 to a continuously operating drive motor 22. The machine itself may be a punch press or any other machine intended to have single stroke operation for the operator's safety. Normally, in the absence of air pressure in line 23, the clutch is disconnected so that the motor 22, even though energized, does not drive the crankshaft 20. The crankshaft also is provided with a brake 24 which is spring-set to lock the crankshaft against movement. However, when air pressure appears in line 23, the brake is released.

A camshaft 25 is rigidly connected to the crankshaft 20 by means of a coupling sleeve 26. The camshaft carries three cams 27, 28 and 29 for operating respective limit switches $LS_7$, $LS_6$ and $LS_3$.

Figure 2:
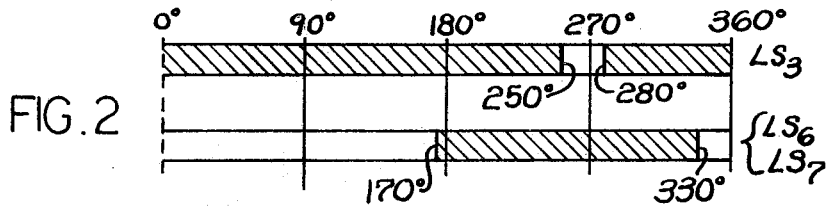
FIG. 2 shows the condition of the limit switches in the present control system throughout each cycle of operation of the machine.

As shown in FIG. 2, limit switch $LS_3$ is closed from 0° to about 250° of the crankshaft rotation, is open from 250° to 280°, and is closed from 280° to 360°. Limit switches $LS_6$ and $LS_7$ are both open from 0° to about 170°, are closed from 170° to 330°, and are open from 330° to 360°.

The air supply to line 23 for releasing the brake 24 and engaging the clutch 21 is under the control of a pair of poppet valves 33 and 34 which are connected in series in the air line between the air inlet 35 and line 23. Poppet valve 33 is under the control of a pilot valve 36 operated by solenoid $K_1$. Similarly, poppet valve 34 is under the control of a pilot valve 37 operated by solenoid $K_2$. Each pilot valve and poppet valve combination preferably is of the type shown in FIG. 4 of U.S. Pat. 3,004,647. Each of the pilot valves is normally open and each has its inlet connected to the air inlet line 35 ahead of the first poppet valve 33, through separate lines 38 and 39, respectively. The outlet line 40 from pilot valve 36 is connected to the poppet chamber in valve 33 to maintain valve 33 closed normally, i.e., when pilot valve 36 is open. Similarly, the outlet line 41 from pilot valve 37 is connected to the poppet chamber in valve 34 to maintain valve 34 closed when pilot valve 37 is open.

When solenoid $K_1$ is energized, it closes pilot valve 36 and the first poppet valve 33 opens.

The first poppet valve 33 is provided with a plunger 42 connected to the movable valve element in this valve and projecting beyond the valve casing. Plunger 42 operates a pair of switches $1VS_4$ and $1VS_6$. These switches are incorporated in a double-pole switch unit of known construction. Normally (i.e., with pilot valve 36 open and poppet valve 33 closed) the plunger is in its extended position beyond the valve casing and maintains switch $1VS_4$ closed and switch $1VS_6$ open. When poppet valve 33 opens, in response to the energization of solenoid $K_1$ and the closing of pilot valve 36, as described, the plunger 42 is retracted and switch $1VS_4$ opens and switch $1VS_6$ closes.

In like manner, the second poppet valve 34 is provided with a plunger 43 which operates a pair of switches $2VS_4$ and $2VS_7$. Normally (i.e., when poppet valve 34 is closed), the plunger 43 is in its extended position and maintains switch $2VS_4$ closed and switch $2VS_7$ open. When valve 34 opens, as described, the plunger 43 is retracted and switch $2VS_4$ opens and switch $2VS_7$ closes.

Figure 1:
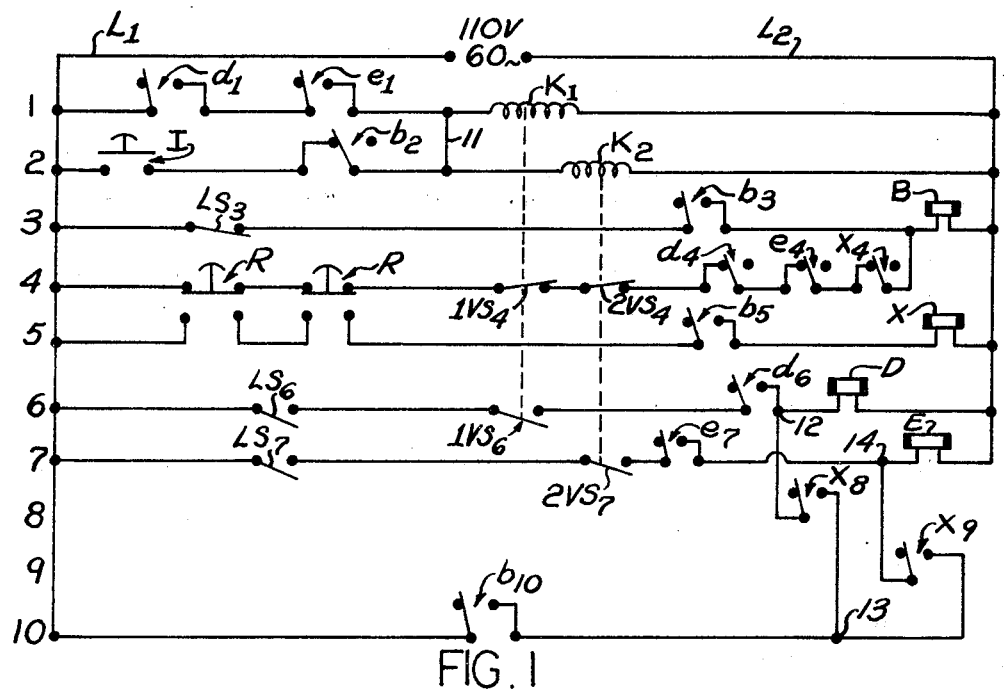
FIG. 1 is a schematic electrical circuit diagram of the present control system.

FIG. 1 shows a circuit diagram of the preferred embodiment of the present control circuit, with the lines numbered for convenience of description. Four relays are provided, a start relay X, an anti-repeat relay B, and two valve relays D and E, and these relays have correspondingly lettered sets of contacts in the various lines of FIG. 1. The different sets of contacts are lettered according to the relay of which they are a part, together with a number subscript corresponding to the number of the line in which they appear.

The power supply lines $L_1$ and $L_2$ are connected across a suitable A.C. power supply.

Line 1 is connected through suitable fuses (not shown) across the power supply lines and includes in series a set of normally-open contacts $d_1$ of the valve relay D, a set of normally-open contacts $e_1$ of the valve relay E, and the aforementioned solenoid $K_1$ which operates pilot valve 36.

Line 2 is connected across the power supply lines and includes in series a normally-open inching push-button switch I, a set of normally-closed contacts $b_2$ of the anti- which operates pilot valve 37. A jumper wire 11 connects the left end of solenoid $K_1$ in line 1 to the left end of solenoid $K_2$ in line 2, so that the valve solenoids are connected in parallel with each other for energization of both via either line 1 or line 2.

Line 3 is connected cross the power supply lines and includes in series the normally-closed cam-operated limit switch $LS_3$, a set of normally-open contacts $b_3$ of the anti-repeat relay B, and the coil of anti-repeat relay B.

Line 4 is connected across the power supply line $L_1$ and the left end of the coil of anti-repeat relay B, and it includes in series the normally-closed contacts of two run switches R, the normally-closed valve switch $1VS_4$ operated by the plunger 42 of valve 33 in FIG. 3, the normally-closed valve switch $2VS_4$ operated by the plunger 43 of valve 34, a set of normally-closed contacts $d_4$ of valve relay D, a set of normally-closed contacts $e_4$ of valve relay E, and a set of normally-closed contacts $x_4$ of start relay X.

Line 5 is connected across the power supply lines and includes in series the normally-open fixed contacts of the two run switches R, a set of normally-open contact $b_5$ of anti-repeat relay B, and the coil of the start relay X.

Line 6 is connected across the power supply lines and includes in series the normally-open cam-operated limit switch $LS_6$, the normally-open valve switch $1VS_6$ operated by the plunger 42 of the valve 33 in FIG. 3, a set of normally-open contacts $d_6$ of valve relay D, and the coil of valve relay D.

Line 7 is connected across the power supply lines and includes in series the normally-open cam-operated limit switch $LS_7$, the normally-open valve switch $2VS_7$ operated by the plunger 43 of valve 34 in FIG. 3, a set of normally-open contacts $e_7$ of valve relay E, and the coil of valve relay E.

A set of normally-open contacts $b_{10}$ of anti-repeat relay B and a set of normally-open contact $x_8$ of start relay X are connected in series between power supply line $L_1$ and the juncture 12 between contacts $d_6$ and valve relay coil D in line 6.

A set of normally-open contacts $x_9$ of start relay D is connected between the juncture 13 of contacts $b_{10}$ and $x_8$ and the juncture 14 of contacts $e_7$ and relay coil E in line 7.

In FIG. 1, the various sets of relay contacts are shown in their normal (relay de-energized) positions. Also, the various cam-operated and valve-operated switches are shown in their respective conditions when the crankshaft 20 is at its 0° position just before the start of a stroke of the press.

In operation, when lines $L_1$ and $L_2$ are connected across the power supply the anti-repeat relay B is energized by way of the normally-closed contacts of the two run switches R in line 4, the normally-closed valve switches $1VS_4$ and $2VS_4$, and the normally-closed relay contacts $d_4$, $e_4$ and $x_4$. When relay B is initially energized in this manner it closes contacts $b_3$ to complete a holding circuit for itself by way of the normally-closed limit switch $LS_3$ in line 3.

When energized, the anti-repeat relay B also closes its contacts $b_5$ and $b_{10}$ and opens its contacts $b_2$.

With relay B energized, its contacts $b_5$ are closed so that when the machine operator depresses the run switches R to close their normally-open contacts in line 5 the start relay X is energized. When this happens contacts $x_4$ open to break the initial energization circuit for anti-repeat relay B, and contacts $x_8$ and $x_9$ close. Anti-repeat relay B remains energized through the holding circuit provided by limit switch $LS_3$ and relay contacts $b_3$, so as to hold its contacts $b_{10}$ closed. The closing of the start relay contacts $x_8$ and $x_9$ completes the initial energization circuits for both valve relays D and E.

When this happens, relay contacts $d_1$ and $e_1$ close to complete the energization circuit for the parallel-connected valve solenoid $K_1$ and $K_2$. Also, contacts $d_4$ and $e_4$ in the initial energization circuit for the anti-repeat relay open, and contacts $d_6$ and $e_7$ close.

The energization of solenoids $K_1$ and $K_2$ causes the pilot valves 36 and 37 in FIG. 3 to close, and this results in the opening of the poppet valves 33 and 34 to admit air under pressure to the clutch 21 and the brake 24. The brake is released and the clutch is engaged, coupling the drive motor 22 to the crankshaft 20 so that the crankshaft begins to turn.

At the same time, the retraction of valve plunger 42, when valve 33 opens, causes valve switch $1VS_6$ to close and valve switch $1VS_4$ to open. Also, the retraction of valve plunger 43 by the opening of valve 34 causes valve switch $2VS_7$ to close and valve switch $2VS_4$ to open.

In order to maintain the start relay X energized, which is necessary to keep the valve relays D and E energized up until the time that the limit switches $LS_6$ and $LS_7$ close, the machine operator must hold the run switches R depressed until after the 170° position of the crankshaft, at which both limit switches $LS_6$ and $LS_7$ are closed by the respective cams, as indicated in FIG. 2. When this happens a holding circuit for valve relay D is completed through limit switch $LS_6$, valve switch $1VS_6$ and holding contacts $d_6$, so that the continued energization of valve relay D does not depend on the start relay contacts $x_8$ and the anti-repeat relay contacts $b_{10}$ remaining closed. Similarly, the closing of limit switch $LS_7$ completes a holding circuit for valve relay E through the valve switch $2VS_7$ and holding contacts $e_7$, so that the continued energization of valve relay E does not depend upon the start relay contacts $x_9$ and the anti-repeat relay contacts $b_{10}$ remaining closed.

When the run switches R are released, the start relay X is de-energized and its contacts $x_8$ and $x_9$ open so that the valve relays D and E are now isolated electrically from each other.

The anti-repeat relay B remains energized via line 3 until about the 250° position of the crankshaft, at which time switch $LS_3$ opens, as indicated in FIG. 2. This breaks the holding circuit for anti-repeat relay B, causing its contacts $b_3$, $b_5$ and $b_{10}$ to open.

At the 280° position of the crankshaft limit switch $LS_3$ is re-closed, but the anti-repeat relay B cannot be re-energized as long as the valve relays D and E remain energized to hold their contacts $d_4$ and $e_4$ open.

At the 330° position of the crankshaft the limit switches $LS_6$ and $LS_7$ re-open, causing the valve relays D and E to be de-energized. As a result the valve relay contacts $d_1$ and $e_1$ re-open, de-energizing the valve solenoids $K_1$ and $K_2$. As a result, the pilot valves 36 and 37 open and the poppet valves 33 and 34 close, thereby shutting off the air supply to the brake 24 and the clutch 21. The clutch is released and the brake is applied to the crankshaft, bringing it to a stop at 360°, after it has completed a full rotation, corresponding to a full stroke of the machine which it operates.

The de-energization of relays D and E also re-closes their respective contacts $d_4$ and $e_4$, and re-closing of valves 33 and 34 also closes the valve switches $1VS_4$ and $2VS_4$, so that now the anti-repeat relay B is re-energized, provided the run switches R have been released by the machine operator.

However, if the operator has held the run switches R depressed throughout the stroke or has depressed them again toward the end of the stroke, the anti-repeat relay B cannot be re-energized via line 4, as described. The same result is obtained if the operator attempts to "beat" the control by staking down one of the run switches.

The only possibility of a repeat stroke would be if, while the operator is holding both run switches depressed, the limit switch $LS_3$ fails to open. However, such a failure would not be dangerous to the operator because his hands would be out of the way, holding the run switches depressed.

In the present system the operation of the anti-repeat relay B can be monitored by closing the inching pushbutton switch I in line 2. If anti-repeat relay B has failed to de-energize, as described, the closing of the inching switch I will fail to operate the machine because the anti-repeat relay contacts $b_2$ will be open.

Despite its comparative simplicity, this control automatically monitors the performance of every component which is critical to the safety of the machine operator, as follows:

If, when energized, the start relay X fails to close both its contacts $x_8$ and $x_9$, the corresponding valve relay D or E cannot be energized to initiate the machine stroke. If, when de-energized in response to the de-energization of the anti-repeat relay B by the opening of limit switch $LS_3$ at 250°, the start relay X fails to have its contacts $x_4$ re-close, the anti-repeat relay B cannot be energized again to permit the next machine stroke to take place.

If valve relay D, when energized, fails to close its contacts $d_1$, the valve solenoids $K_1$ and $K_2$ cannot be energized to begin the machine stroke. The same is true if the other valve relay E, when energized, fails to close its contacts $e_1$.

Also, if valve relay D, when energized, fails to close its contacts $d_6$, then the machine stroke will stop after the operator releases the run switches R, even though limit switch $LS_6$ will have closed. Similarly, if valve relay E, when energized, fails ot close its contacts $e_7$, then the machine stroke will stop after the operator releases the run switches R even though the limit switch $LS_7$ will be closed.

If, when valve relay D is de-energized at 330°, its contacts $d_4$ fail to re-close, the anti-repeat relay B cannot be re-energized to permit the next machine stroke to take place. The same is true if the contacts $e_4$ of valve relay E fail to re-close when it is de-energized at 330°.

If the pilot valve 36 sticks closed or the poppet valve 33 sticks open, then the valve-operated switch $1VS_4$ will not re-close at the completion of the machine stroke and consequently the anti-repeat relay B cannot be re-energized to permit the next machine stroke. Similarly, if the pilot valve 37 sticks closed or the poppet valve 34 sticks open, then the valve-operated switch $2VS_4$ will not re-close at the completion of the machine stroke for re-energization of the anti-repeat relay B.

If the pilot valve 36 sticks open or the poppet valve 33 sticks closed, either due to a failure of the valve itself or a failure of the operating solenoid $K_1$, then the machine stroke cannot begin. Similarly, the machine stroke cannot begin if the pilot valve 37 sticks open or the poppet valve closed, either due to a valve failure or a failure of the operating solenoid $K_2$.

If either valve solenoid $K_1$ or $K_2$ fails to energize or de-energize at the proper time, this will cause the respective pilot valve to remain open or closed, and the monitoring will take place as just described.

If limit switch $LS_6$ fails to close at 170°, then relay D will be de-energized when the operator releases the run switches R. Similarly, if limit switch $LS_7$ fails to close at 170°, then relay E will be de-energized when the operator releases the run switches.

The present control system requires that for each cycle of operation of the machine the following sequence of operation of the relays take place:

(1) The anti-repeat relay B is energized via line 4;
(2) The start relay X is energized via line 5 after the anti-repeat relay's holding circuit via line 3 has been established and the run switches R have been actuated by the operator;
(3) The valve relays D and E are energized after both the anti-repeat relay B and the start relay X have been energized; and
(4) The run switches R must be released and the start relay X must be de-energized before the anti-repeat relay B can be energized again via line 4 since its holding circuit has been broken by the opening of limit switch $LS_3$.

From the foregoing it will be apparent that the described embodiment of the present control system insures the operator's safety by preventing any unexpected re-cycling of the machine because each of the control components whose failure might otherwise permit such re-cycling has its performance monitored so as to lock up the system against a repeat cycle in the event of such a failure.

While a presently-preferred embodiment of the present control system has been described in detail with reference to the accompanying drawing, it is to be understood that various modifications, omissions and adaptations which differ from the disclosed embodiment may be adopted without departing from the scope of the present invention. For example, the valve solenoids may be connected as shown in the aforementioned U.S. Pat. 3,004,647 so as to be separately energized through respective normally-open contacts of the individual valve relays, instead of each valve solenoid being controlled jointly by both valve relays, as illustrated in FIG. 1.

I claim:

1. In a single cycle control system having a pair of valve relays which both must be energized for a cycle of operation of the machine to take place, an anti-repeat relay operative to prevent a repeat cycle of the machine, means for initially energizing said anti-repeat relay before the start of each cycle of the machine, a start relay for energizing said valve relays initially, and run switch means operable by the machine operator to energize said start relay provided said anti-repeat relay is energized.

2. A system according to claim 1, and further comprising means for preventing the initial energization of said anti-repeat relay unless said start relay and both valve relays are de-energized.

3. A system according to claim 1, and further comprising initial energization circuits for the valve relays including relay contacts operable by said anti-repeat relay and said start relay to complete the initial energization circuits for the valve relays only if both the anti-repeat relay and the start relay are energized.

4. A system according to claim 1, and further comprising normally-closed relay contacts in the initial energization circuit for the anti-repeat relay and operable by the start relay and the valve relays to prevent initial energization of the anti-repeat relay unless the start relay and both valve relays are de-energized, and further comprising initial energization circuits for the valve relays including relay contacts operable by said anti-repeat relay and said start relay to complete the initial energization circuits for the valve relays only if both the anti-repeat relay and the start relay are energized.

5. A system according to claim 1, and further comprising a pair of valves arranged to be opened individually in response to the energization of the respective valve relays to start the operation of the machine and to be closed at the end of each cycle of the machine, and a pair of normally-closed valve switches connected in the initial energization circuit for the anti-repeat relay and each positioned to be opened individually in response to the opening of the respective valve and to remain open to thereby prevent the initial energization of the anti-repeat relay for the next cycle of the machine if the corresponding valve has remained open at the end of a cycle of the machine.

6. In a single cycle control system having a pair of valve relays which both must be energized for a cycle of operation of the machine to take place, an anti-repeat relay for preventing a repeat cycle of the machine, a start relay for energizing the valve relays initially provided the anti-repeat relay is energized, and means for initially energizing the anti-repeat relay before the start of each cycle of the machine and including normally-closed contacts operable by the start relay and the valve relays to prevent the initial energization of the anti-repeat relay unless the start relay and the valve relays are de-energized.

7. A control system according to claim 6, and further comprising initial energization circuits for the valve relays including relay contacts operable by said anti-repeat relay and said start relay to complete the initial energization circuits for the valve relays only if both the anti-repeat relay and the start relay are energized.

8. A control system according to claim 6, and further comprising a pair of valves arranged to be opened individually in response to the energization of the respective valve relays to start the operation of the machine and to be closed at the end of each cycle of the machine, and a pair of normally-closed valve switches connected in the initial energization circuit for the anti-repeat relay and each positioned to be opened individually in response to the opening of the respective valve and to remain open to thereby prevent the initial energization of the anti-repeat relay for the next cycle of the machine if the corresponding valve has remained open at the end of a cycle of the machine.

9. In a single cycle control system having a pair of valve relays which both must be energized for a cycle of operation of the machine to take place, an anti-repeat relay for preventing a repeat cycle of the machine, a start relay for energizing the valve relays initially, and initial energization circuits for the valve relays including relay contacts operable by said anti-repeat relay and said start relay to complete the initial energization circuits for the valve relays only if both the anti-repeat relay and the start relay are energized.

10. A system according to claim 9, and further comprising an initial energization circuit for the anti-repeat relay, and a pair of valves arranged to be opened individually in response to the energization of the respective valve relays to start the operation of the machine and to be closed at the end of each cycle of the machine, and a pair of normally-closed valve switches connected in the initial energization circuit for the anti-repeat relay and each positioned to be opened individually in response to the opening of the respective valve and to remain open to thereby prevent the initial energization of the anti-repeat relay for the next cycle of the machine if the corresponding valve has remained open at the end of a cycle of the machine.

11. In a single cycle control system having valve means for controlling the operation of a machine and solenoid means for operating said valve means to start a cycle of the machine, an anti-repeat relay operable to prevent a repeat cycle of the machine and having a set of normally-closed contacts connected to said solenoid means, and an inching switch connected in series with said contacts for selectively energizing said solenoid means while said anti-repeat relay is de-energized to maintain said contacts closed.

12. A system according to claim 1, wherein said run switch means has normally-closed contacts which are part of said means for initially energizing the anti-repeat relay and normally-open contacts connected in an energization circuit for the start relay, said run switch means preventing a repeat energization of the anti-repeat relay if the machine operator maintains its normally-open contacts closed toward the end of a machine cycle for the purpose of maintaining the start relay energized.

13. In a single cycle control system, the combination of valve relay means operable when energized to cause a cycle of operation of a machine, an anti-repeat relay, a start relay, means providing an initial energization circuit for said anti-repeat relay including normally-closed contacts of said start relay and said valve relay means which prevent the initial energization of the anti-repeat relay unless said start relay and said valve means are de-energized, means providing a holding circuit for the anti-repeat relay after it is initially energized, run switch means having normally-close contacts in said initial energization circuit for the anti-repeat relay, an energization circuit for the start relay including normally-open contacts of said anti-repeat relay and normally-open contacts of said run switch means which permit the energization of the start relay only after the anti-repeat relay has been energized and said run switch means has been actuated to close its normally-open contacts, and initial energization circuit means for said valve relay means including normally-open contacts of said anti-repeat relay and said start relay to prevent the initial energization of said valve relay means unless both the anti-repeat relay and the start relay are energized.

14. A control system according to claim 13, and further comprising normally-closed limit switch means connected in said holding circuit for the anti-repeat relay and arranged to be opened during each cycle of operation of the machine to break said holding circuit for the anti-repeat relay so as to de-energize the anti-repeat relay and thereby break said energization circuit for the start relay even if the machine operator has held said normally-open contacts of said run switch means closed.

References Cited

UNITED STATES PATENTS

| | | | |
|---|---|---|---|
| 3,004,647 | 10/1961 | Andrus et al. | 192—142 |
| 3,036,683 | 5/1962 | Fischer et al. | 192—142 |
| 3,227,255 | 1/1966 | Heiberger | 192—142 |

MARK M. NEWMAN, Primary Examiner

A. D. HERRMANN, Assistant Examiner

U.S. Cl. X.R.

192—12, 129, 144

UNITED STATES PATENT OFFICE
CERTIFICATE OF CORRECTION

Patent No. 3,509,976          Dated May 5, 1970

Inventor(s) George M. Coon

It is certified that error appears in the above-identified patent and that said Letters Patent are hereby corrected as shown below:

Column 3, line 30, after "anti-" insert -- repeat relay B, and the aforementioned solenoid $K_2$ --

Column 3, line 52, change "contact" to -- contacts --.

Column 8, line 32, after "valve" insert -- relay --.

Column 8, line 35, change "close" to -- closed --.

SIGNED AND SEALED
SEP 8 - 1970

(SEAL)
Attest:

Edward M. Fletcher, Jr.
Attesting Officer

WILLIAM E. SCHUYLER, JR.
Commissioner of Patents